United States Patent

Yonenoi

[11] Patent Number: 6,079,148
[45] Date of Patent: Jun. 27, 2000

[54] ELASTIC FLY HOLDING MAT

[76] Inventor: Kimio Yonenoi, No. 21-4 Ebisu Minami, 2-Chome, Shibuya-ku, Tokyo 150, Japan

[21] Appl. No.: 08/958,021

[22] Filed: Oct. 27, 1997

[30] Foreign Application Priority Data

Nov. 22, 1996 [JP] Japan ................................. 8-013287

[51] Int. Cl.[7] .......................... A01K 97/00; A01K 97/06
[52] U.S. Cl. ............................................ 43/57.1; 43/57.2
[58] Field of Search ..................................... 43/57.1, 57.2

[56] References Cited

U.S. PATENT DOCUMENTS

| | | | |
|---|---|---|---|
| 2,144,300 | 1/1939 | Stryker | 43/57.2 |
| 2,364,807 | 12/1944 | Nelson | 43/57.1 |
| 3,461,599 | 8/1969 | Sylvester | 43/57.1 |
| 3,507,071 | 4/1970 | Bryson | 43/57.1 |
| 4,183,431 | 1/1980 | Schmidt | 43/57.2 |
| 4,287,987 | 9/1981 | Hoffman | 43/57.2 |

FOREIGN PATENT DOCUMENTS 16-73  1/1994  Japan.

*Primary Examiner*—Kurt Rowan

[57] ABSTRACT

An fly holding mat for fishing having at least a fly holding stair and at least a cut-out portion, within an area of an elastic rectangular mat. The fly holding stair is provides a plurality of through slits which are of the same length and the same lateral interval therebetween. A plurality of fly guide slots for the slits are located at one vertical side of the stair or on the upper surface of the stair. A connecting portion of the stair forms a frame for the fly holding mat at another vertical side of the stair. A fly can be inserted into the slit to hold it on the fly holding stair by insertion along an opening in a bottom of the fly guide slot.

15 Claims, 4 Drawing Sheets

ELASTIC FLY HOLDING MAT

FIELD OF THE INVENTION

This invention relates to an elastic fly or lure holding mat for use during storage and transport and during use when fishing. The mat is provided with guide slots which can functionally assist in the insertion of a fine fly or lure into a slit on a holding stair of the holding mat to reliably retain the fine fly or lure thereon.

BACKGROUND OF THE INVENTION

In fishing a fly or lure is used frequently for bait and the fly or lure is chosen, for example, in accordance with the type of fish, the environmental or natural conditions or the environmental or natural conditions of the location. Accordingly, many flies or lures must be prepared or be available for effective fishing and be used properly for a plentiful fishing result.

Generally, many flies or lures have been held in a foamed plastic mat provided with many slits so that they can easily be removed from the mat at any fishing location or under any fishing conditions. The mat can be made in any suitable size such that it is reliably disposed in a fly or lure box and can be easily removed to provide access to the fly or lure or provide access to the fly or lure without removing the mat from the fly or lure tackle box.

FIG. 7 is a perspective view of a known fly holding mat. In FIG. 7 the fly holding mat body M is made of a foamed polyethylene or other foam plastic resin material. The mat is provided with many slits S which are, respectively, deeply cut into the mat to a desired depth and length. The respective cuts leave a bottom of the mat so that the fly or lure can be systematically held after insertion into the slit, but also easily removed from the slit at any time without any injury to the fly or lure.

There are many other known fly or lure holding mats. For example, a foamed plastic mat in which the fly or lure is held on a wave-shaped surface, etc., have also been distributed in the fishing tackle market.

These known holding mats, which can functionally receive and retain a fly or lure, have attained their purposes in structure and function. However, even though the foam polyethylene mat is provided with many slits has generally been used to functionally hold the flies, it is believed to be inadequate in practical use and is inconvenient, as described hereafter.

Firstly, it is difficult for the user to see the slit S formed into the foamed polyethylene mat because of the lateral elasticity of the foam acting in the direction of arrows f and f', as shown in FIG. 7. The forces f and f' tend to move the walls forming the slit closer together thereby making it difficult to find the slit, when the fly A is to be inserted into the slit to be held elastically. In order to properly insert the fly or lure it is necessary to identify and locate the slit in the upper surface or the vertical edge of the slit in the foam body. One way of identifying or location the slits is to press the mat downwardly or laterally at a location, for example, generally at D, adjacent to the slit with the finger on one hand while holding the fly or lure in the same hand or the other hand. This insertion of the fly is not only very difficult but also very troublesome, even for a skilled person in the art of fishing.

Secondly, the place for changing the fly during fishing may have poor footing or be in the water as well have poor natural light and be in the shade thereby making it difficult to effect speedy change or insertion of the fly in the known mat.

Thirdly, the slit in the known foamed mat has a portion D which is not cut through completely to a bottom of the mat and does not hold the fly. If the depth of the cut forming the slit is shallow or if the elastic pressure of the walls forming the slit is weak, the fly may be insufficiently held in the mat even if the fly is fully inserted into the bottom of the slit.

Lastly, it may be necessary to use a bulky or larger foamed mat to completely hold the fly and this will inevitably require a larger tackle box for such a mat. A larger tackle box may, accordingly, be impractical or inconvenient.

SUMMARY OF THE INVENTION

The fly holding mat is cut from a foamed polyethylene plate having a suitable thickness and hardness. The mat is formed into the shape of a flat or waved rectangular plate having at least a cut-out space and at least a fly holding stair which has a suitable width and is separated suitably from the other side of the mat or another stair, within an area of the mat.

The fly holding stair is cut through to its bottom surface to form a plurality of cut-through slits separated by the same interval. A vertical common end portion of the slits remains on the flat or waved rectangular plate, without being cut through, as a connecting portion or the stair to the rectangular plate.

Either of the vertical end portions or an upper surface portion of the stair may also be cut off in the form of a V- or wave-shape, respectively. The slit may coincide with a bottom of the valley of the V- or wave-shaped portion at either of the vertical end portions and the upper surface portion of the stair to provide a guide slot for easy insertion of the fly.

Additionally, the slit in the fly holding stair is cut through to the under-surface of the stair so that the fly can be held exactly even on a rather thin holding mat. Consequently, a rather thin tackle box may be used functionally for the holding mat.

The fly holding mat may also be sold as a separate commodity. A base plate and an adhesive tape may be, respectively, adhered to a bottom surface of the mat. The mat may then be inserted into an existing tackle box.

An embodiment of the invention provides a fly holding mat comprising at least a fly holding stair, which includes a plurality of through slits thereon and a plurality of guide slots for the flies for the through slits, and at least a cut-out space within an area of an elastic rectangular mat, to hold the flies functionally for fishing.

An embodiment of the invention provides a fly holding mat having vertically V-shaped guide slots on an end of a fly holding stair, which can be used functionally in fishing.

An embodiment of the invention provides a fly holding mat having vertically wave-shaped guide slots on either of the end portions of the mat and at an upper surface of a fly holding stair, which can be used functionally in fishing.

An embodiment of the invention provides a fly holding mat having vertically table-land guide slots on an end of a fly holding stairs, which can be used functionally in fishing.

An embodiment of the invention provides a fly holding mat which has a width which is thinner and less than the known fly holding mat.

An embodiment of the invention provides a fly holding mat which can be sold as a separate commodity for fishing tackle.

DETAILED DESCRIPTION OF THE PREFERRED EMBODIMENTS

Figure 1:
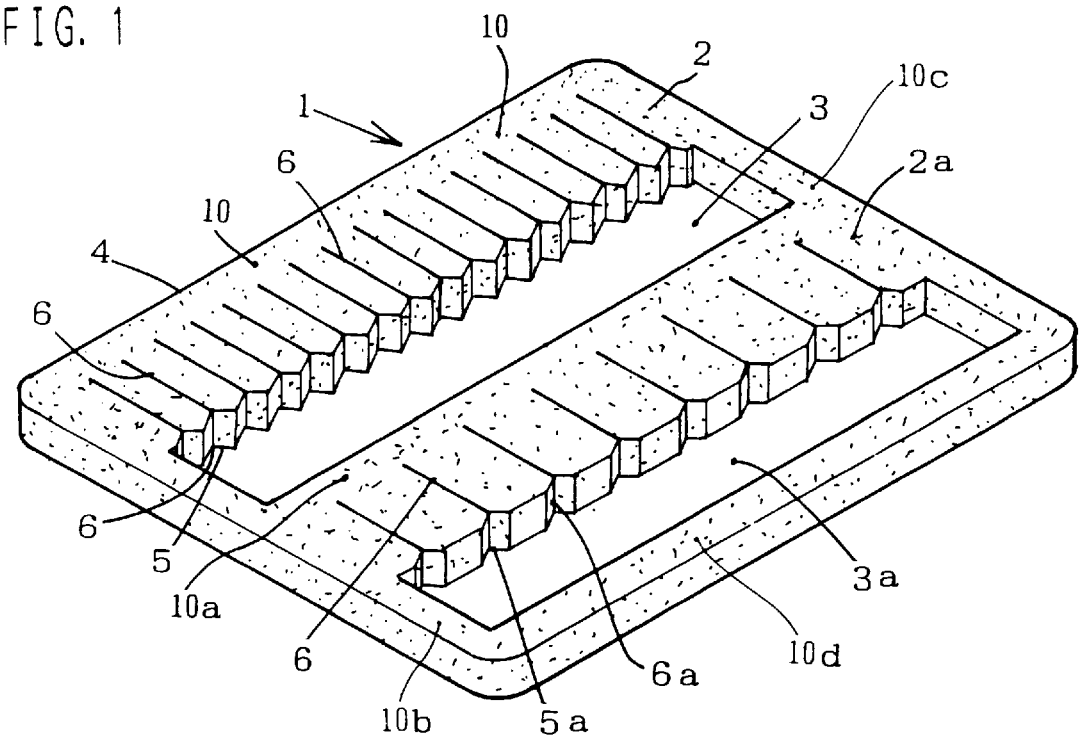
FIG. 1 is a perspective view of an embodiment of a fly holding mat.

In FIG. 1 a fly holding mat 1 is described as a rectangular mat 4 having first and second fly holding stairs 2, 2a spaced, respectively, by first and second cut-out portions 3, 3a. The cut-out portions 3, 3a are cut from within an area of the mat 4. The mat 1 may be a foamed plastic material, such as a foamed polyethylene plate, foamed polypropylene plate, foamed polyurethane plate, etc., having suitable hardness and thickness.

The first fly holding stair 2 has a plurality of through slits 6 spaced laterally in equal intervals and a plurality of V-shaped guide slots 5 arranged vertically at one side of the slits 6 along the first cut-out portion 3. The second fly holding stair 2a, has a plurality of through slits 6 which are spaced at larger intervals than the first stair 2, and a plurality of table-land shaped guide slots 5a arranged vertically at one side of the slits 6a along the second cut-out portion 3a.

The lateral spaced interval of the slits 6, 6a on the first and second stairs and both shapes of the guide slots 5, 5a may be the same, respectively, however, they may also differ because there are many sizes and types of flies which can be held in the fly holding mat 1.

The stairs 2, 2a may be of three or more of the same size and shapes or different sizes and shapes, etc., within the area of the fly holding mat 1, according to the fishing conditions.

The stairs 2, 2a have vertical connecting portions 10, 10a, 10d and lateral connecting portions 10b, 10c within the area of the rectangular mat 4, at both vertical and lateral sides of both stairs, and between both lateral connecting portions 10b, 10c, forming a frame for the fly holding mat 1.

Figure 2:
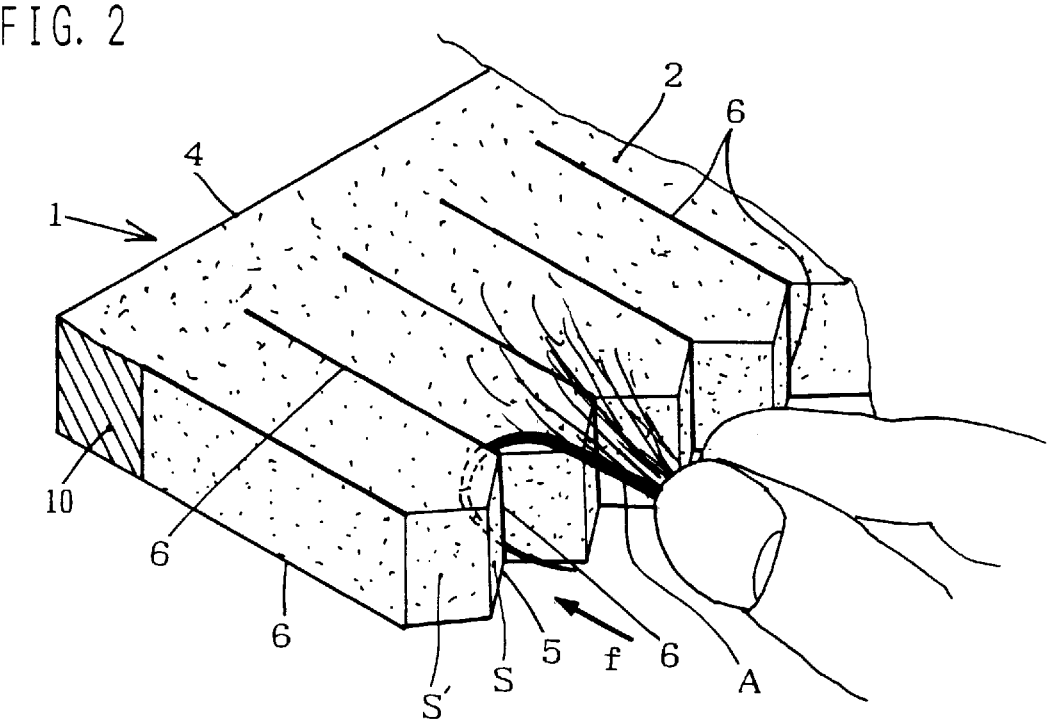
FIG. 2 is a partial perspective view of an insertion of a fly into a fly holding mat.

The fly holding slits 6, 6a in FIG. 1 coincide with the bottoms of the ravine formed by the V-shaped or table-land-shaped guide slots 5, 5a. As shown in FIG. 2, the fly A can easily be inserted into the slit 6 or 6a, which is barely visible, and elastically held therein. The fly is merely inserted into a crevice at the bottom of the ravine of the guide slot 5 or 5a, and disposed in the direction of arrow f along the slope s or s' of the slot, regardless of the natural conditions at the fishing location or the weather and so on.

Figure 3:
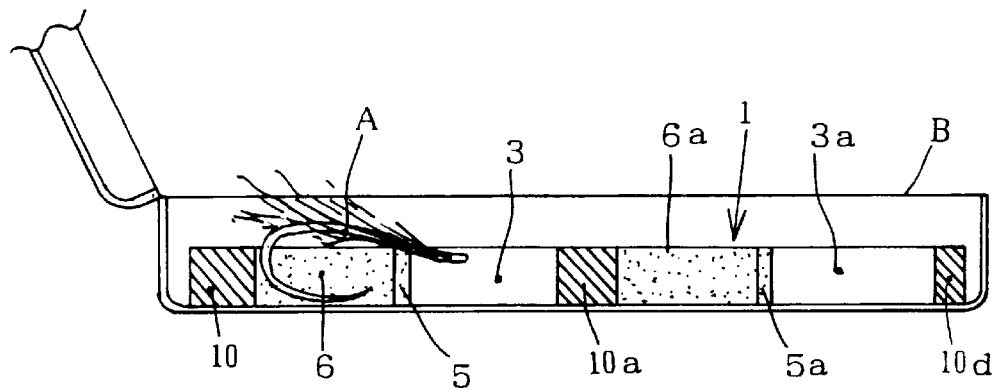
FIG. 3 is a sectional view of an embodiment of a fly holding mat box showing a held fly.
Figure 7:
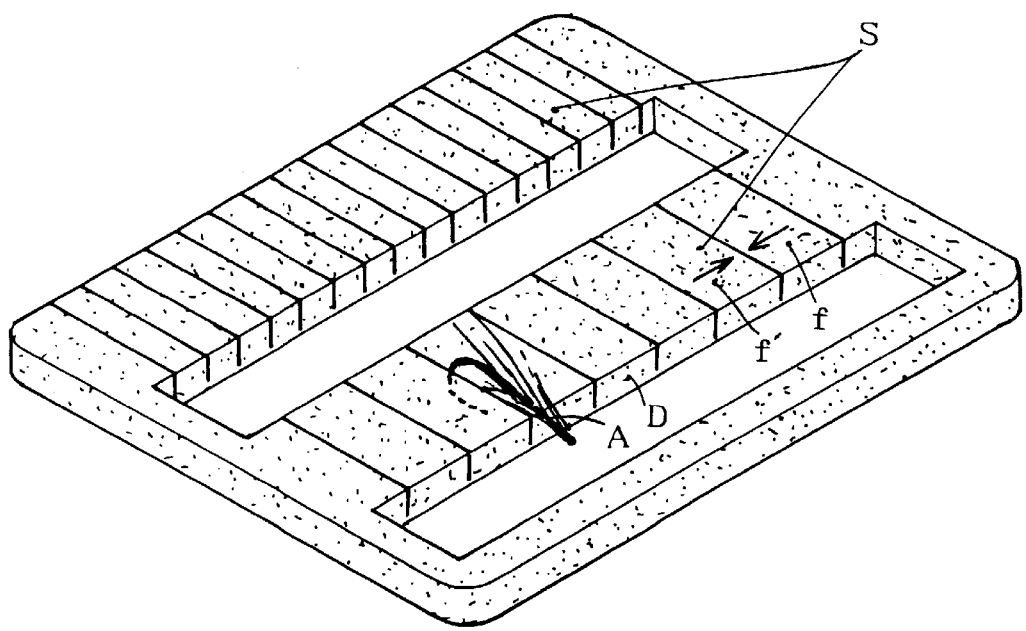
FIG. 7 is a perspective view of a known fly holding mat.

The slits 6, 6a do not create a dead portion D, as shown in the fly holding mat of FIG. 7 where the slits have not been completely cut through to the bottom surface of the fly holding mat 1. The fly A can be elastically held in the slit 6 and is received directly on a bottom surface of the fly holding mat box B, as shown in FIG. 3. Accordingly, the widths of both the fly holding mat 1 and the fly holding mat box B can be further diminished, respectively, as compared to the mat M or a corresponding box for the known mat as shown in FIG. 7.

Figure 4:
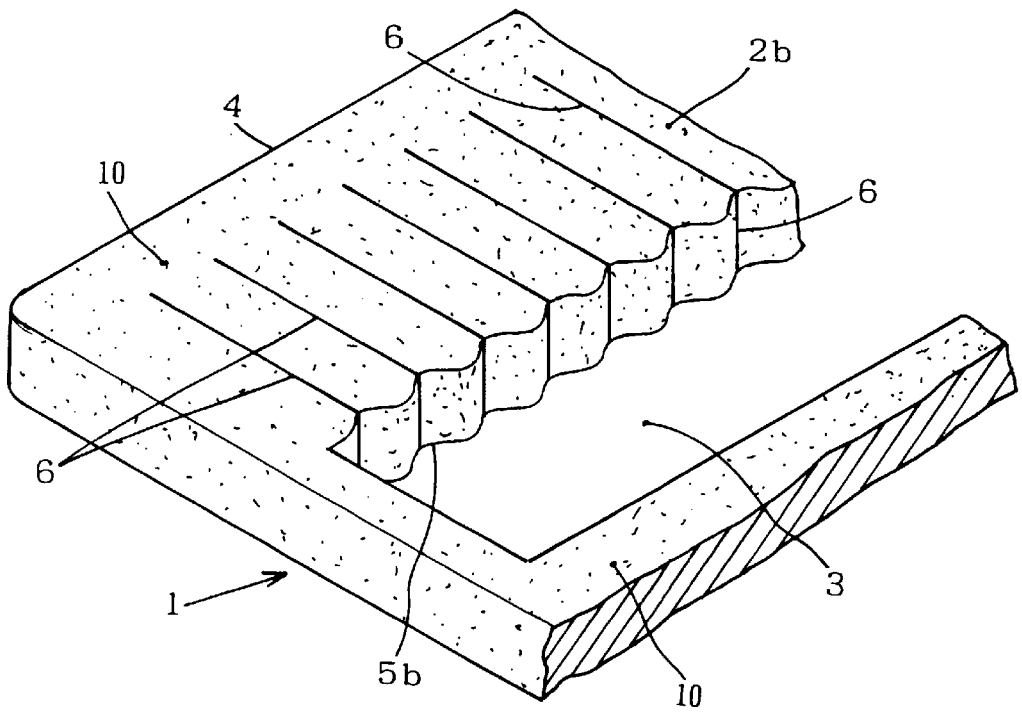
FIG. 4 is a partial perspective view of an embodiment of the fly holding mat of FIG. 1.

An embodiment of the fly holding mat 1 is described in FIG. 4. The mat 1 comprises almost the same fundamental features as in the embodiment of FIG., except for a wave-shaped fly holding guide slot 5b formed vertically on one side of the fly holding stair 2b. The guide slot 5b is formed more roundly as a wave portion as compared to the V-shaped fly holding guide slot 5 in FIG. 1. Therefore the wave portion is stronger than the V-shaped because all corners of the V-shaped are at a sharp acute angle and can easily break off. The fly can be easily inserted into respective slots 6 through both of the guide slots 5, 5b of FIG. 1 or the guide slots of FIG. 4.

Figure 5:
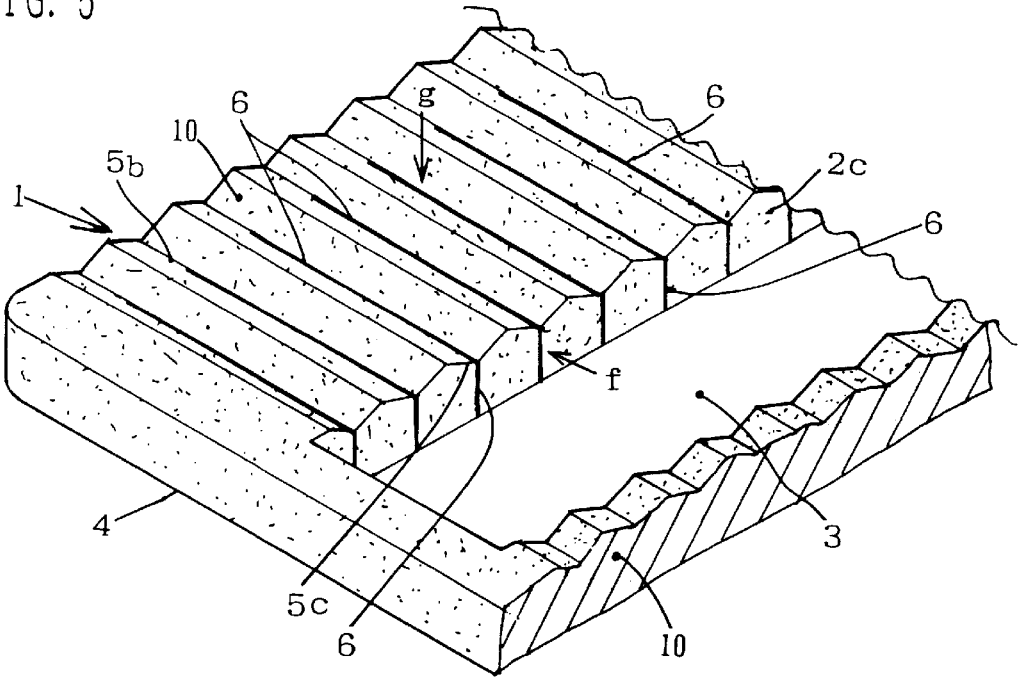
FIG. 5 is a partial perspective view of an embodiment of a fly holding mat.

An embodiment of the fly holding mat 1 is described in FIG. 5. The mat 1 comprises almost the same fundamental features common to the embodiments shown in FIGS. 1 and 4, except for a vertical V-shaped fly holding stair 2c which has V-shaped guide slot 5c on an upper surface perpendicular to the stair 2c surface. The V-shaped guide slot 5c is cut through from one end of the upper surface of a rectangular mat 4 to a first cut-out portion 3 to form slits 6 leaving a connecting portion 10 which does not have slits. An inside surface of the fly holding stair 2c adjacent the cut-out portion 3 is cut off perpendicular to the stair 2c. Accordingly, the fly A can be easily inserted into the slits 6 in the direction of arrows f and g along a bottom of the ravine of guide slot 5c which coincides with the slits 6.

Figure 6:
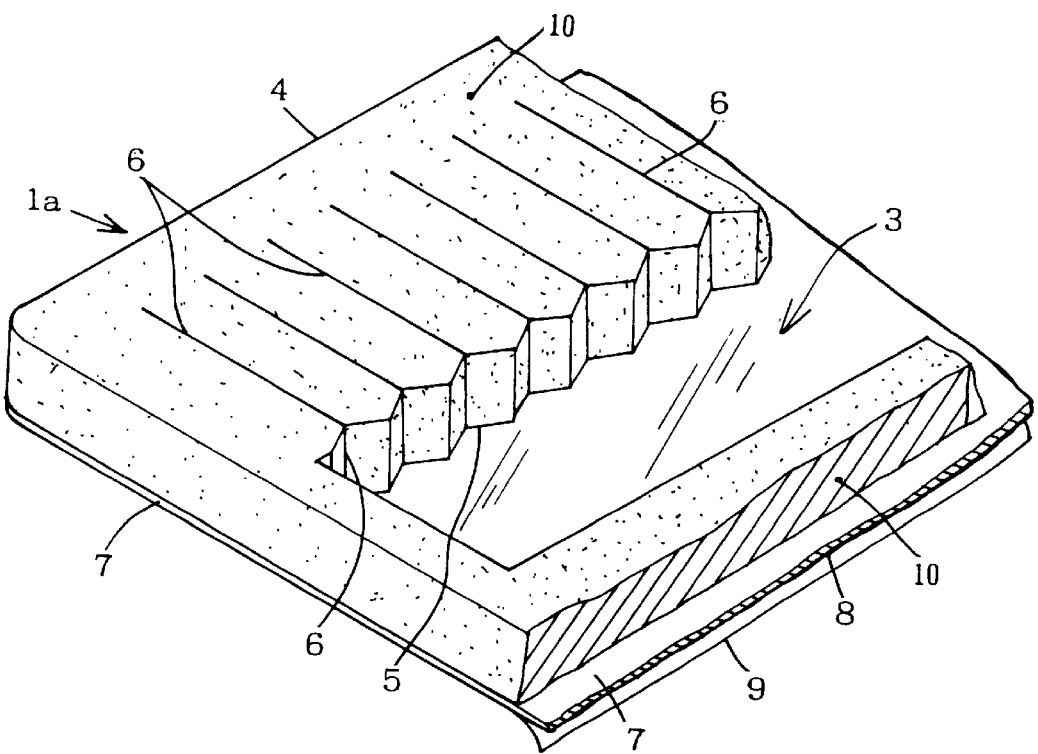
FIG. 6 is a partial perspective view of an embodiment of a fly holding mat.

Each embodiment described in FIGS. 1 to 5 is described for a fly holding mat which has a different fly guide slot 5, 5a, 5b or 5c, and which can be received fixedly in a standard fly holding mat box B. In a further embodiment described in FIG. 6 a fly holding mat la can be used randomly in a desired mat box or with a desired tackle box as described hereafter. The fly holding mat 1a in FIG. 6 comprises an elastic fly holding mat 4 as shown in FIG. 1, a base plate 7 having a suitable hardness, an adhesive agent layer 8 and a removable tape 9. The mat 4 is adhered to an inner bottom surface of a desired fly holding mat box B or on an inner bottom surface of a mid box of a fishing cooler (not shown) by the adhesive agent layer 8, after the adhesive tape 9 is stripped off. The base plate 7 may also be adhered to a bottom of the fly holding mat 4 to reinforce the mat even if the elastic fly holding mat itself can be used without it.

The fly holding mat 1 of FIG. 1 can be provided with a wave-shaped guide slot according to FIG. 4 or the V-shaped guide slot according to FIG. 5. Consequently, many types of fly holding mats 1a can be distributed conveniently as a single commodity for fishing, without a standard mat box.

While there has been described and pointed out the fundamental features of the invention as applied to preferred embodiments, it will be understood that the number of fly holding stairs 2 or cut-out portions 3, their arrangements and combinations, the number of slits 6, their interval, the types of fly guide slots 5 and their combinations on the fly holding stair 2, etc., may be changed properly, and that various omission and substitution and change in the form and details of the fly holding mat described, may be made by those skilled in the art without departing from the spirit of the invention. The invention, therefore, is limited only as indicated by the scope of the claims.

What is claimed is:

1. A holding mat for a fishing fly comprising:
   an elastic mat of a foam material having a thickness between an upper surface and a bottom surface;
   the mat having at least one portion within an area of the mat cut-out from the thickness of the mat;
   at least one fly holding stair formed on the upper surface of the mat area which is not the cut-out portion;
   the fly holding stair having a plurality of slits extending vertically through the thickness of the mat from the upper surface to the bottom surface to support the fly substantially vertically in one of the slits;

a connecting portion formed on the fly holding stair which is disposed spaced from a vertical side of the cut-out portion and into which the slits do not extend; and a plurality of slots equal to the plurality of slits, the slots disposed at each of the slits and forming a guide for the entry of the fly into the slit, wherein the guide slots are formed on and extend across the upper surface; and the slits extending from the slot to the connecting portion and being spaced from each other along the fly holding stair.

2. The fly holding mat of claim 1 wherein the elastic mat is foamed plastic resin form the group consisting of foamed polyethylene, foamed polypropylene and foamed polyurethane.

3. The fly holding mat of claim 1 wherein the elastic mat comprises two different fly holding stairs and two cut-out portions disposed within an area of the elastic mat.

4. The fly holding mat of claim 1 wherein the mat comprises two or more of the same or different fly holding stairs, the stairs having a guide slot from the group consisting of a vertical or perpendicular or V-shaped or wave-shaped or table-land-shaped, and two or more cut-out portions within an area of the mat.

5. A combination of the fly holding mat of claim 1 and a tackle box wherein the mat is adhered to the box.

6. The fly holding mat according to claim 1 wherein the slits have, with respect to each other, a fixed lateral spacing.

7. The fly holding mat according to claim 1 wherein the slits on at least one of the holding stairs has a lateral spacing different than the lateral spacing on another holding stair.

8. The fly holding mat according to claim 1 wherein the guide slots are V-shaped formed on the vertical side and extend across the vertical surface and the thickness of the mat, the slits being between adjacent V-shaped slots.

9. The fly holding mat according to claim 1 wherein the guide slots are table-land shaped formed on the vertical side and extend across the vertical surface and the thickness of the mat.

10. The fly holding mat according to claim 8 wherein the guide slots are table-land shaped formed on the vertical side and extend across the vertical surface and the thickness of the mat.

11. The fly holding mat according to claim 1 wherein the guide slots are wave-shaped formed on the vertical side and extend across the vertical surface and the thickness of the mat, the slits being between adjacent wave-shaped guide slots.

12. A holding mat for a fishing fly comprising:

an elastic mat of a foam material having a thickness between an upper surface and a bottom surface;

the mat having at least one portion within an area of the mat cut-out from the thickness of the mat;

at least one fly holding stair formed on the upper surface of the mat area which is not the cut-out portion;

the fly holding stair having a plurality of slits extending vertically through the thickness of the mat from the upper surface to the bottom surface to support the fly substantially vertically in one of the slits;

a connecting portion formed on the fly holding stair which is disposed spaced from a vertical side of the cut-out portion and into which the slits do not extend; and a plurality of slots equal to the plurality of slits, the slots disposed at each of the slits and forming a guide for the entry of the fly into the slit, wherein the guide slots are formed on and extend across the upper surface;

the slits extending from the slot to the connecting portion and being spaced from each other along the fly holding stair;

a base plate of a suitable hardness for supporting the mat; and an adhesive agent layer covered with a removable tape adhered to the base plate.

13. The fly holding mat of claim 12 wherein the guide slots are V-shaped, the slits being between adjacent V-shaped guide slots.

14. The fly holding mat of claim 12 wherein the mat is an elastic material.

15. The fly holding mat of claim 12 wherein the mat is rectangular.

* * * * *